United States Patent [19]

Frederick

[11] Patent Number: 5,484,382
[45] Date of Patent: Jan. 16, 1996

[54] METHOD FOR EXTRACTING WASTE FLUID FROM A USED VEHICLE FILTER

[76] Inventor: Earl Frederick, 10205 Southern Ave., SE., Albuquerque, N.M. 87123

[21] Appl. No.: 458,222

[22] Filed: Jun. 2, 1995

Related U.S. Application Data

[63] Continuation of Ser. No. 120,722, Sep. 13, 1993, abandoned.

[51] Int. Cl.$^6$ ............................................. B04B 5/02
[52] U.S. Cl. ............................ 494/37; 494/12; 494/33; 210/261
[58] Field of Search ........................... 494/11, 12, 16, 494/20, 37, 60, 31, 33, 901; 100/37, 106, 902; 210/361, 362

[56] References Cited

U.S. PATENT DOCUMENTS

| | | | |
|---|---|---|---|
| 717,305 | 12/1902 | Gathmann . | |
| 3,351,273 | 11/1967 | Harrison | 233/20 |
| 3,409,215 | 11/1968 | Reuter | 233/20 |
| 3,682,374 | 8/1972 | Joyce | 494/16 |
| 4,154,793 | 5/1979 | Guigan | 422/55 |
| 5,060,564 | 10/1991 | Buford et al. | 100/52 |
| 5,156,751 | 10/1992 | Miller | 210/787 |
| 5,214,830 | 6/1993 | Rozycki | 100/902 |
| 5,242,370 | 9/1993 | Silver | 494/16 |
| 5,298,079 | 3/1994 | Guymon | 100/37 |

FOREIGN PATENT DOCUMENTS

| | | | |
|---|---|---|---|
| 32879 | 11/1907 | Austria | 210/361 |
| 27962 | of 1907 | United Kingdom | 210/361 |

*Primary Examiner*—David Scherbel
*Assistant Examiner*—Terrence R. Till
*Attorney, Agent, or Firm*—Ice Miller Donadio & Ryan; Paul B. Overhauser; Doreen J. Gridley

[57] ABSTRACT

Method for extracting a waste fluid from a used vehicle filter. A centrifuge includes at least one support for holding the filter in a position such that the filter's aperture is oriented radially outward from the axis of rotation of the centrifuge. A housing includes a vertical wall and surrounds the centrifuge so that as the centrifuge is spun, waste fluid within the filter is caused to exit through the filter's aperture into the housing. The method for extracting waste fluid from a used filter according to the present invention includes the steps of providing a centrifuge capable of receiving a used vehicle filter and rotating the centrifuge to cause fluid to exit through the filter's aperture.

7 Claims, 2 Drawing Sheets

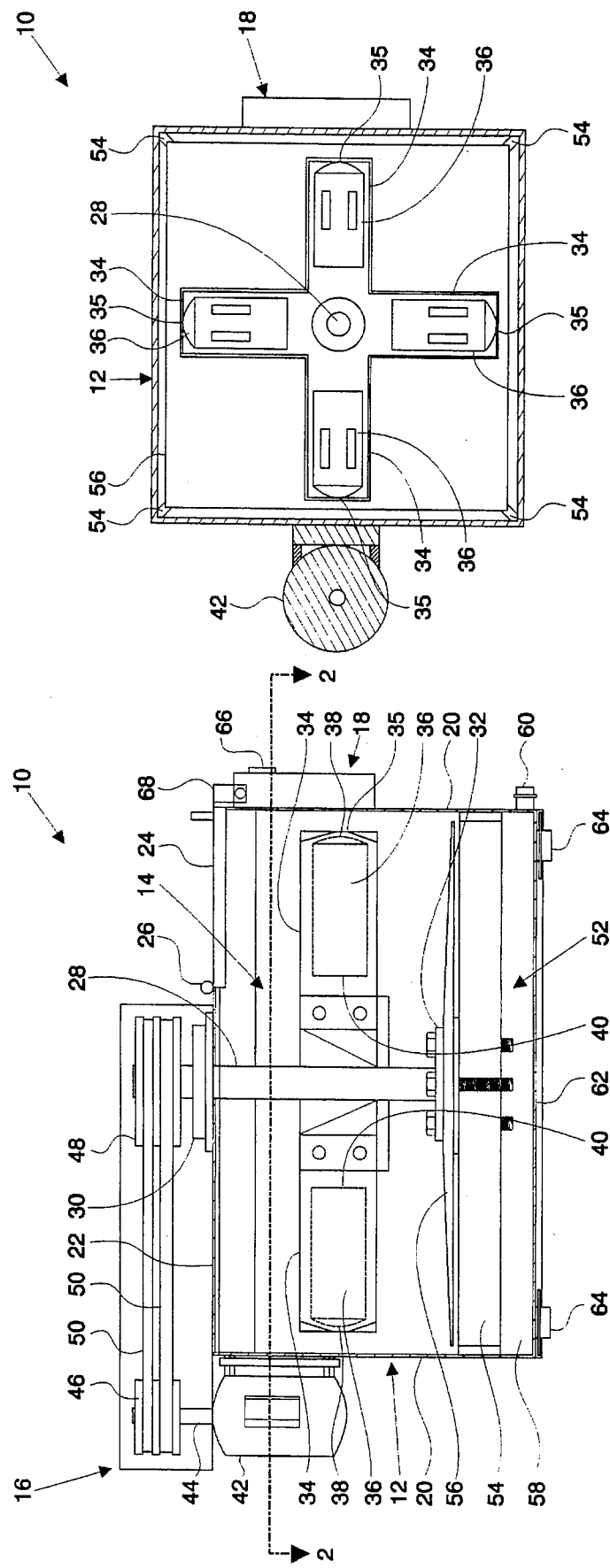

5,484,382

METHOD FOR EXTRACTING WASTE FLUID FROM A USED VEHICLE FILTER

This is a continuation of Ser. No. 08/120,722, filed Sep. 13, 1993, now abandoned.

FIELD OF THE INVENTION

This invention relates to a method for removing waste fluid from a used vehicle filter for environmentally acceptable disposal of both the fluid and the filter.

BACKGROUND OF THE INVENTION

Environmental concerns have led to increased concern regarding the disposal of materials considered hazardous waste, including vehicle fluids such as engine oil, hydraulic oil, antifreeze, gear oil, transmission oil, fuel, and gas. As a consequence, special disposal methods, including recycling, have been developed for disposal of these fluids. For example, when an automobile service organization removes engine oil from a vehicle during an oil change, the oil is no longer "thrown away," but instead is collected so that it may be properly disposed of. The disposal of such filters also requires special handling because the filter contains a waste fluid which can harm the environment. If, however, the hazardous waste material can be removed from the filter, the disposal of the filter is less troublesome. Many such filters comprise a paper filter and a metal or plastic housing. Both these components may be recycled or otherwise disposed of in a conventional manner if the hazardous waste material is substantially removed from the filter. Therefore, it is desirable to develop a method for removing the hazardous waste fluid from such a vehicle filter.

One approach to removing oil from a used automobile oil filter is disclosed in U.S. Pat. No. 5,060,564. Rather than simply pressing downward on the oil filter so that the oil filter becomes flat thereby squeezing the oil therefrom, the oil extractor of U.S. Pat. No. 5,060,564 converts low pressure compressed air power to hydraulic power and uses a hydraulic source to draw a plate against the bottom of filter to squeeze the filter and remove the oil therefrom. Though this oil extractor is stated to meet Federal standards of 1990 mandating that 75% of the oil be removed from the filter prior to discarding the filter, the extractor is comprised of numerous costly components which may also require maintenance or repair. It is therefore desirable to develop an oil extractor composed of few working components to thereby minimize manufacturing, maintenance and repair costs. It is also desirable to provide a method of extraction which requires less energy than may be necessary to crush a filter composed of high strength materials, and which can extract more than 75% of the waste fluid in a filter.

The use of air pressure and a hydraulic source in the extractor of U.S. Pat. No. 5,060,564 also necessitates that precautions be taken to make certain that the air and hydraulic fluid do not leak to thereby maintain adequate pressure for squeezing the filter. These precautions are in addition to the mechanisms necessary to contain the oil extracted from the filter and may affect the potential for failure of the extractor. Also, the extractor utilizes a fluid, namely hydraulic fluid, which must also be safely disposed of. It is therefore desirable to develop an oil extractor which utilizes a power source which does not utilize a significant amount of a hazardous material for the generation of power and which only requires that precautions be taken to contain the oil extracted from the filter.

OBJECTS OF THE INVENTION

Accordingly, it is one object of the present invention to provide a method for extracting an environmentally hazardous waste fluid from a vehicle filter.

It is another object of the present invention to provide a method which utilizes an extractor composed of few working components to thereby minimize manufacturing, maintenance and repair costs associated therewith.

It is still another object of the present invention to provide an extraction method which employs an extractor which does not utilize a significant amount of hazardous material for its own operation.

It is yet another object of the present invention to provide an extraction method which consumes little energy and which effectively removes substantially all of the fluid from a used filter.

BRIEF DESCRIPTION OF THE DRAWINGS

FIG. 1 shows a side sectional view of one embodiment of an extractor which may be used to practice the method of the present invention.

FIG. 2 shows a top sectional view of a second embodiment an extractor having a mechanism for supporting four vehicle filters which may be used to practice the method of the present invention.

SUMMARY OF THE INVENTION

Figure 3:
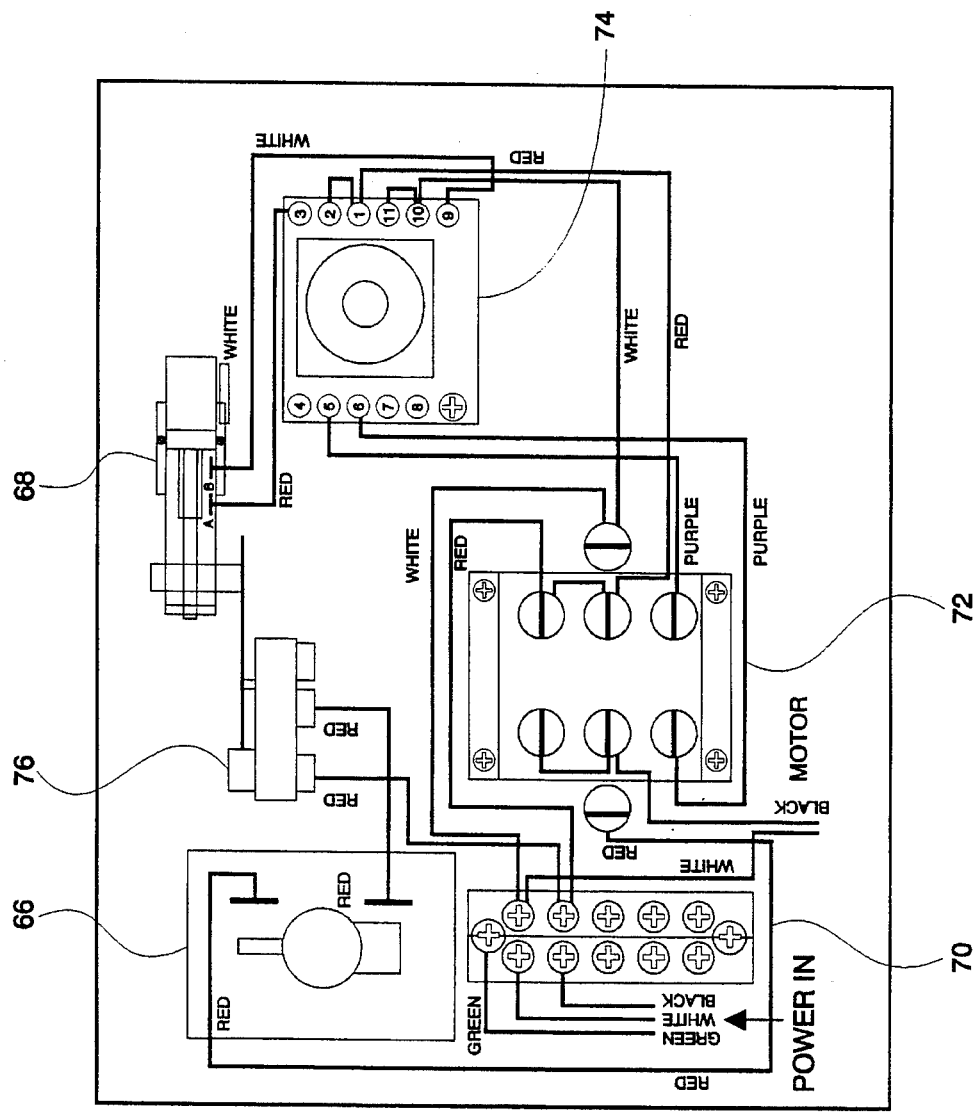
FIG. 3 shows a schematic diagram of the control circuitry combined with the door latch of the extractor of the present invention.

An extractor apparatus may be utilized to remove fluid from a filter having at least one aperture through which the fluid may be extracted or withdrawn. The extractor includes a centrifuge rotatable about an axis, and a housing. The centrifuge includes a means for supporting the filter such that the filter's aperture is oriented radially outward from the axis of rotation of the centrifuge. The housing includes a vertical wall surrounding the centrifuge so that as the centrifuge is spun by the rotating means, fluid within the filter exits through the filter's aperture into the housing. The method for extracting fluid from a filter of the present invention includes the steps of providing an extractor having a centrifuge and a means for rotating the centrifuge, and then rotating the centrifuge.

A control means may control the speed and duration of the rotation of the centrifuge so that substantially all the waste fluid is removed from the filter. The top portion of the housing also includes a door providing access to the support means therethrough when the door is in its open position. The extractor includes a switch connected to the door and to the control means. The switch is activated when the door is in its open position and detection of such activation by the monitoring control means results in the control means ceasing rotation of the rotating means. In this manner, the centrifuge cannot be rotated by a motor unless the door is closed thereby ensuring that the fluid is contained within the housing during rotation of the centrifuge and protecting the operator from the rotating centrifuge. Also, a latch may be connected to the door. The latch is movable between a locked position in which the latch locks the door in its closed position denying access to the support means therethrough, and an unlocked position in which the latch allows the door to be moved between its open and closed positions. The latch is also connected to the control means such that upon motorized rotation of the rotating means, the control means places the latch in its locked position to thereby deny access to the support means during rotation of the centrifuge. When the centrifuge stops spinning, the control means places the latch in its unlocked position allowing one to access the filter(s) within the housing.

DETAILED DESCRIPTION

Referring now to FIG. 1, there is shown a side sectional view of one embodiment of an extractor which may be used to practice the method of the present invention. In this view, the near side of the housing has been removed. Extractor 10 includes housing 12, centrifuge 14, means 16 for rotating centrifuge 14, and control means 18. Housing 12 substantially surrounds centrifuge 14 and includes vertical walls 20 and top portion 22. Top portion 22 includes door 24, shown here in its closed position, which is connected by hinge 26 to the remainder of top portion 22. When door 24 is in its closed position as shown, top portion 22 substantially covers centrifuge 14.

Centrifuge 14 includes shaft 28 which is supported by first and second bearings 30 and 32, respectively, and is rotatable about its longitudinal axis. The longitudinal axis of shaft 28 also defines the vertical axis about which centrifuge 14 rotates. First bearing 30, a spider bearing, is connected to top portion 22 of housing 12 and second bearing 32 resides within housing 12 as is described in further detail herein. Centrifuge 14 also includes means 34 for receiving and supporting filter 36. Two such receiving means 34 and used vehicle filters 36 are illustrated in FIG. 1 and each receiving means 34 is connected to shaft 28 such that as shaft 28 rotates about the vertical axis, each receiving means 34 also rotates.

Filters 36 each include first and second apertures (not shown) disposed respectively at first and second ends 38 and 40. For example, for a typical vehicle oil filter, the aperture in second end 40 is manufactured into the filter, while the aperture in first end 38 may be punched in first end 38 after the used filter is removed from the vehicle. Fluid (not shown) residing within filter 36 may be withdrawn or extracted from filter 36 through the aperture of either first end 38 or second end 40. Each receiving means 34 constitutes a recess sized for the receipt of filter 36 and oriented radially outward from the axis of rotation of centrifuge 14 such that when filter 36 is placed within receiving means 34, first aperture of first end 38 of filter 36 is oriented radially outward from the vertical axis of centrifuge 14. In this embodiment, each receiving means 34 also includes aperture 35 which is aligned with the aperture of first end 38 of filter 36 and is also positioned on the outer portion of receiving means 34.

Connected to shaft 28 of centrifuge 14 is rotating means 16. Activation of rotating means 16 results in the rotation of centrifuge 14 about its vertical axis. In this embodiment, rotating means 16 includes motor 42 having rotatable motor shaft 44 extending therefrom. Connected to motor shaft 44 is first pulley set 46. Connected to shaft 28 of centrifuge 14 is second pulley set 48. Extending between first and second pulley sets 46 and 48 are belts 50.

Extractor 10 also includes means 52 for collecting fluid. Shaft 28 of centrifuge 14 is supported within housing 12 by second bearing 32 and second bearing 32 is in turn supported by bearing spider 54 having windage tray 56 thereon. Bearing spider 54 includes four appendages (see FIG. 2) which are bolted to housing 12 at the corners of vertical walls 20 and above bottom portion 62 of housing 12. Beneath bearing spider 54 is reservoir 58 having drain plug 60. In this embodiment, bearing spider 54, windage tray 56 and reservoir 58 all reside within housing 12 on top of bottom portion 62 of housing 12 and drain plug 60 extends outward from vertical wall 20 of housing 12. Reservoir 58 is, in this embodiment, essentially that portion of the interior o housing 12 bordered on top by bearing spider 54 and on bottom by bottom portion 62 of housing 12. Also attached to bottom portion 62 of housing 12 are vibration mounts 64.

During operation, the provision of power to motor 42 causes motor shaft 44 to rotate which, in turn, causes first pulley set 46 to rotate. The rotational movement of first pulley set 46 causes the rotation of second pulley set 48 through belts 50 and the rotation of shaft 28 of centrifuge 14. As shaft 28 rotates about its longitudinal axis, each receiving means 34 also rotates about the same axis. Fluid residing within filter 36 is moved by the centrifugal forces through the aperture of first end 38 of filter 36. Aperture 35 in receiving means 34 allows waste fluid to flow from receiving means 34 into housing 12 during such rotation of centrifuge 14. Fluid extracted from filter 36 and residing within housing 12 moves toward vertical walls 20, as assisted by windage tray 56, and through bearing spider 54 to be collected in reservoir 58. If drain plug 60 is opened, fluid may also be drained into another storage container, such as a barrel.

It will be appreciated by those of skill in the art that the shape of windage tray 56 shown in FIG. 1, i.e., the incline of windage tray 56 downward and away from shaft 28 (approximately a 15° angle in this embodiment), assists in moving fluid within housing 12 toward vertical walls 20 of housing 12 into reservoir 58. It will also be appreciated that when extractor 10 is placed on a rigid surface, vibration mounts 64 assist in maintaining the position of extractor 10. Without such mounts, the rotation of centrifuge 14 and the vibrations resulting therefrom are apt to move extractor 10 from its desired position on such a surface.

It will also be appreciated that the method of waste fluid extraction of the present invention offers several advantages over the prior art wherein the filter is essentially crushed to remove fluid therefrom. First, the filter is not damaged with the present method of extraction thereby allowing the filter's components to be disposed of in an environmentally conscientious manner. Secondly, less energy is necessary to spin the filters than is required to crush a filter composed of high strength materials. Also, the extractor of the present invention is composed of few working components thereby minimizing manufacturing, maintenance and repair costs.

It is worthy to note that the filters in the embodiment of FIG. 1 have two apertures. The aperture of second end 40 usually is the aperture connected to the fluid source. For example, for an automotive oil filter, the aperture of second end 40 is usually threadably engaged with the engine block. The aperture of first end 38 is utilized as the aperture through which fluid is withdrawn in the embodiment of FIG. 1 as this aperture is closest to the largest reservoir of fluid residing within the filter. However, fluid may also be withdrawn from the aperture of second end 40. Further, should a filter only comprise one aperture, the filter may be placed in the extractor for removal of fluid therefrom providing fluid can be withdrawn through that aperture. Thus, filters having a varying number of apertures are contemplated for use with the disclosed extractor.

It will be appreciated by those of skill in the art that the method of the present invention may be utilized for filters of various sizes by utilizing an extractor in which the motor, receiving means and housing are sized accordingly. For example, in the embodiment of FIG. 1, motor 44 comprises a 1½ HP Balador single or three phase 120/240 volt motor which is sufficient to remove fluid from filters of up to 4×8 inches. Similarly, a 3 HP Balador single or three phase 120/240 volt motor is sufficient to remove fluid from filters of up to 6×14 inches, and a 5 HP Balador single or three phase 120/240 volt motors may be used to remove fluid from filters up to 8×18 inches.

Extractor 10 of FIG. 1 also includes control means 18 which is attached to the exterior of one vertical wall 20 of housing 12. Control means 18, discussed in greater detail herein, is connected to motor 42 to control the speed and length of time of the rotation of shaft 28. To that end, timer switch 66 extends from control means 18 for selection of the duration of rotation of centrifuge 14. Control means 18 is also connected to latch 68. Latch 68, described in greater detail in association with FIG. 3 herein, is connected to door 24 of housing 12 to lock door 24 in a closed position. When door 24 is in its closed position and locked via latch 68, access is denied to the interior of housing 12, i.e., to centrifuge 14 residing therein.

FIG. 2 shows a top sectional view of a second embodiment of an extractor capable of simultaneously extracting fluid from four filters when used to practice the method of the present invention. In this embodiment, centrifuge 14 includes four receiving means 34 for receipt of filters 36. In this manner, the fluid from four filters 36 may be simultaneously removed using the method of extraction of the present invention.

It will be appreciated by those of skill in the art that various embodiments of an extractor may be designed in support of a varying amount of filters to practice the method of the present invention. Generally, it is desirable to ensure that, regardless of the number of receiving means 34 provided for such an extractor, that receiving means 34 are evenly spaced to result in a balanced spinning of centrifuge 14. However, such balancing is not essential to either the design or operation of centrifuge 14 as a weight may be used in place of a filter or in place of a receiving means if so desired.

Referring now to FIG. 3, there is shown a schematic diagram of the control circuitry combined with the door latch of the extractor of the present invention. In this embodiment, electric power is provided to terminal block 76, such a part no. 525 manufactured by Buchanan, which is electrically connected to power contactor 72 and timer switch 66. Power contactor 72 may be, for example, part no. 41NB30AFM manufactured by Furnas, and timer switch 66 may be part no. A515M manufactured by Tork. Time delay relay 74, such as part no. 6X154F manufactured by Dayton, is connected to power contactor 72 and to electrically actuated door latch 68, such as part no. 16 from Guardian, as shown. Timer switch 66 is connected to door switch 76, such as part no. Z15GW-B7-K manufactured by Micro, which is in turn connected to door latch 68. Power is provided to the motor of the extractor of the present invention through both power contactor 72 and terminal block 70.

In this embodiment, power is only provided to the motor if the door is in its closed position. Specifically, door latch 68 is connected to door 24 (see FIG. 1) such that placement of door 24 in its closed position, i.e., the position illustrated in FIG. 1 wherein top portion 22 substantially covers receiving means 34, causes activation of door switch 76. Activation of door switch 76 completes the electrical circuit for incoming power to the motor such that shaft 28 may be rotated by the motor. Thus, during operation, if door switch 76 is activated, control means 18 ceases the rotation of shaft 28 and centrifuge 14.

In addition to not permitting motor 44 to run while door 24 is open, control means 18 of the present invention also includes means for timing the rotational operation of motor 44 and locking door latch 68 during such rotation. By timing the rotational operation of motor 44, the user can be assured that extractor 10 has been operated a sufficient amount of time to remove fluid from filters 36. The time selected may vary depending on the size of the filters and the size of the motor employed in the extractor. For example, when using a 1½ HP motor to extract fluid from filters up to 4×8 inches in size, a time of three to four minutes is desirable; for a system using a 3 HP motor for filters up to 6×14 inches in size, the filters should be spun for approximately four to five minutes; and, for filters up to 8×18 inches in size using a 5 HP motor, a time of six to eight minutes should be sufficient. Thus, the time may be set with timer switch 66.

During operation, door latch 68 is placed in its locked position by control means 18 upon the provision of power to control means 18. In the locked position, door latch 68 keeps door 24 in its closed position which prevents one from accessing the interior of housing 12 and centrifuge 14 and filter(s) 36 therein. If door latch 68 is in its locked position and door switch 76 is activated, power is provided to the motor to rotate centrifuge 14. Upon completion of the rotation of centrifuge 14 to remove substantially all the fluid within filter(s) 36, a length of time selected via timer switch 66, control means 18 ceases rotation of centrifuge 14 by no longer supplying power to the motor. After a delay period established by time delay relay 74, control means 18 then places door latch 68 in its unlocked position. By delaying the unlatching of door latch 68 until sometime after the motor is no longer provided with power, the operator is denied access to the moving components of extractor 10 unless those components are stationary. The latching feature of extractor 10 also provides greater assurance that the operator will not be splattered with oil during operation of extractor 10.

It will be appreciated that various control mechanisms may be employed for controlling the rotating means. Further, the specific means used to only permit the rotating means to operate when the access door is closed and the timing mechanism may be comprised of different components than those illustrated in FIG. 3. These variations of operating the control means are contemplated to be within the scope of the invention.

It will be further appreciated that the rotating means need not be an electric motor as presented herein. The rotating means may comprise, for example, a hydraulic motor, an air-powered motors, or a crank to be powered manually. Regardless of the type of motor employed, it will be appreciated that the configuration of extractor 10 as disclosed herein is efficient and results in an environment within the housing that is fairly pure, i.e., all that is collected by the collecting means positioned beneath the housing is the fluid withdrawn from the filters. It is unlikely that other materials will be present in the collected fluid. It will also be appreciated that, for environmentally conscientious reasons, use of an electric motor or a manually operated hand crank may be preferable over other power sources, since neither of these power sources utilizes a substantial amount of hazardous material for its operation. This may be compared to a hydraulic power source which utilizes hydraulic fluid which requires certain precautions and is also subject to disposal regulations.

Finally, as used herein and in the claims, fluid is intended to encompass any fluid, such as engine oil, hydraulic oil, antifreeze, gear oil, transmission oil, fuel, gas, and the like, for which a filter is utilized in an application requiring such a fluid.

What is claimed is:

1. A method for extracting waste fluid residing in a vehicle filter, the filter having a filter element enclosed in a housing having at least one aperture therethrough from which the fluid may be extracted, the filter housing also having an opening for connection of the filter to an engine, the opening opposite the at least one aperture, the method comprising the steps of:

providing an extractor comprising
a centrifuge rotatable about an axis and having at least one means for supporting at least one used filter such that the at least one filter's aperture is oriented radially outward from the axis of rotation of the centrifuge, and
means for rotating the centrifuge;

placing the filter in the extractor such that the opening faces the axis of rotation of the extractor; and rotating the centrifuge with the rotating means such that waste fluid residing in the used filter is caused to exit from the filter's aperture.

2. A method for extracting waste fluid residing in a vehicle filter, the filter having a filter element enclosed in a housing having a first end and a second end and having an opening for connection to an engine on the second end of the housing, the method comprising the steps of:

punching at least one aperture in the first end of the housing;

providing an extractor comprising
a centrifuge rotatable about an axis and having at least one means for supporting at least one used filter such that the at least one filter's aperture is oriented radially outward from the axis of rotation of the centrifuge, and
means for rotating the centrifuge;

placing the filter in the extractor such that at least one of the apertures in the housing faces away from the axis of rotation; and rotating the centrifuge with the rotating means such that waste fluid residing in the use filter is caused to exit from the filter's aperture.

3. The method of claim 1, further comprising the steps of:

continuing to rotate the centrifuge until substantially all waste fluid is removed from the at least one used filter; and stopping the rotation of the centrifuge.

4. The method of claim 1, wherein the extractor further comprises means for controlling the speed and duration of the rotation of the rotating means, the method further comprising the step of:

controlling the duration and speed of rotation of the rotating means until substantially all fluid residing within the filter has been extracted.

5. The method of claim 1, wherein the extractor further comprises a housing surrounding the centrifuge, the housing having a vertical wall, the extractor also including means for collecting fluid disposed beneath the vertical wall of the housing, the method further comprising the step of:

collecting waste fluid exited from the filter's aperture within the collecting means.

6. The method of claim 1, wherein the extractor further comprises:

a housing surrounding the centrifuge, the housing having a vertical wall, and a top portion connected to the vertical wall of the housing for substantially covering the centrifuge as the centrifuge rotates, the top portion including a door movable between an open position and a closed position, the door providing access to the supporting means of the centrifuge therethrough when the door is in the open position, the method further comprising, prior to rotating the centrifuge, the step of:

placing the door in the closed position.

7. The method of claim 6, wherein the extractor further comprises a latch connected to the door and movable between a locked position in which the latch locks the door in the closed position and an unlocked position in which the latch allows the door to be moved between the open and closed positions, the method further comprising, prior to rotating the centrifuge, the step of:

placing the latch in the locked position.

* * * * *